Feb. 8, 1949.   R. PUDELKO ET AL   2,461,081
MULTIPLE TARIFF COUNTER FOR MEASURING INSTRUMENTS
Filed Sept. 23, 1943
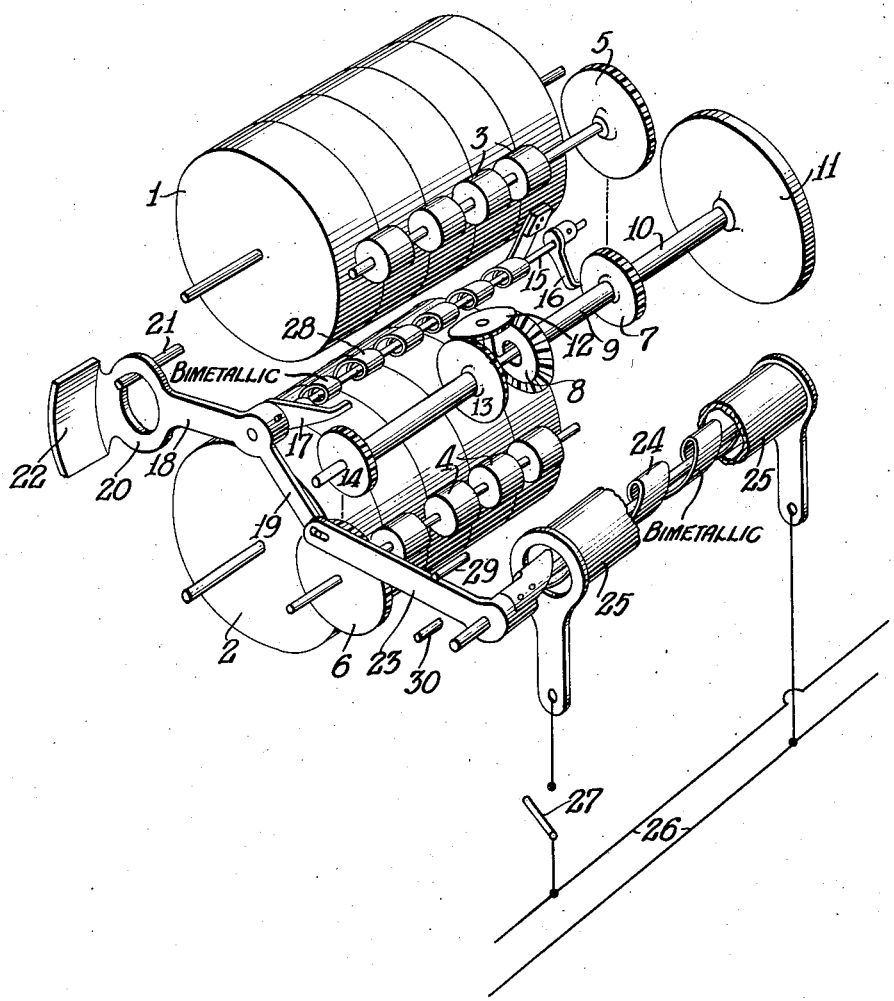
Inventor:
Richard Pudelko
and Paul Moos,
by Morgan, Finnegan and Durham
Attorneys Patented Feb. 8, 1949

2,461,081

UNITED STATES PATENT OFFICE 2,461,081

MULTIPLE TARIFF COUNTER FOR MEASURING INSTRUMENTS

Richard Pudelko and Paul Moos, Zug, Switzerland, assignors to Landis & Gyr, A. G., Zug, Switzerland, a body corporate of Switzerland Application September 23, 1943, Serial No. 503,469
In Switzerland July 7, 1942

3 Claims. (Cl. 235—92)

In the known multiple tariff counters for measuring instruments, as, for instance, electricity meters, the switching or change-over to the various tariffs is performed by relays or electro-magnets. Such relays are comparatively bulky and, therefore, require much material as well as space to mount them in the instruments; they may interfere with the proper working of the instrument, and they are liable to be rendered uncertain in action by external influences. Such relays are also easily subject to humming or buzzing.

The present invention has for its primary object to overcome these drawbacks and according to it, as embodied in a multiple tariff counter for measuring instruments, a resistance is directly connected into the line or network and acts upon a bimetallic strip which in turn controls the change-over device of the tariff mechanism. The resistance and bimetallic strip may lie spacially one within each other, whereby the resistance, which may be in the shape of a tube, may surround the bimetallic strip which is preferably wound in the manner of a spiral.

The accompanying drawing shows diagrammatically, by way of example, a constructional form of embodiment in an exploded, perspective view, wherein there is only shown what is necessary for a proper understanding of the invention.

Referring more particularly to this drawing, the numerals 1 and 2 respectively designate the unit drums or rolls of the trains of a two-rate counter; 3, 4 are the tens switching pinions associated therewith, and 5 and 6 are the gears which drive the drums or rolls of the respective trains. The gear wheel 5 meshes with a gear 7, which latter, together with a sunwheel 8 of a differential, is rigidly mounted on a hollow sleeve or shaft 9. This shaft 9 is freely rotatable on a shaft 10 on which the driving wheel 11 for the counter is secured and which also carries the planetary wheel 12 of the differential gear. The second sunwheel 13 of the differential gear is fixed to and for rotation with a pinion 14 in driving connection with the gear wheel 6.

Between the sets of drums or rolls 1, 2 and the shaft 10 is a control shaft 15 provided with two pawls 16, 17 and an angle lever 18, 19. The pawls 16, 17 cooperate with the wheels 7, 14 in such a way that alternately the pawls by reverse movements of the shaft 15 engage the wheels 7 and 14, thereby locking one set of drum rolls or the other against motion. The arm 18 of the angle lever 18, 19 is formed with an eye 20 engaged by a pin 21 stationarily supported in the counter by which the angular deflection of the lever 18, 19 is limited, said arm carrying at its free end a plate 22 that bears in a known manner the signs or marks indicating the service condition of the counter.

The arm 19 of the angle lever 18, 19 constitutes with an arm 23 a toggle lever, the arm 23 being rigidly connected to one end of a bimetallic strip 24 wound in the manner of a spiral, the other end of said strip being fixed in the counter. The bimetallic spiral 24 is surrounded with clearance by a tube-shaped resistance 25 connected to terminals of the line or network 26. The numeral 27 indicates a breaker in this connection which may be controlled by a time-switch.

The control shaft 15 is spirally encircled by a bimetallic strip 28 with clearance, one end of the strip being rigidly attached to the control shaft 15, the other end thereof being suitably fixed in the counter.

In cooperation with the resistance 25, the bimetallic strip 24 serves to control the counter, whereas the bimetallic strip 28 forms with the shaft 15 a room temperature compensating device to regulate the action of the measuring instrument according to the temperature of the room in which the counter is disposed.

Assuming now that the circuit in which the resistance 24 is arranged be interrupted, as shown in the drawing, then the arm 23 rests on an abutment or stop 29 and the toggle lever 23, 19 has allowed the plate 22 to descend to its lower indicating position, in which the top of the eye 20 rests upon the pin 21 and the pawl 16 locks the gearing 7, 5 and with it the rolls 1 against movement, whereas the pawl 17 is moved to a position to release the gearing 14, 6. The measuring instrument then registers the measured value produced via the driving wheel 11 (the sunwheel 13 turning on the planetary wheel) and the gearing 14, 6 on the rolls 2.

If now, for a tariff change, the circuit of the resistance 25 be closed by the breaker 27, so that the resistance 25 is heated, this heats the bimetallic spiral 24, which contracts, thus causing the toggle lever 23, 19 to swing down and its arm 23 to bear against an abutment 30. As a result, the arm 18 is raised and moves plate 22 to its upper indicating position and the pawl 16 is moved out of engagement with the wheel 7, while the pawl 17 snaps into engagement with wheel 14. By this means the sunwheel 13 will be held fixed and the planetary wheel 12 will turn thereon, thus transmitting the produced measured value via sunwheel 8 and gearing 7, 5 to the rolls 1. When the current connection is again interrupted at 27, the resistance 25 cools, the thermostat 24 expands and the parts 23, 19, 18, 17 and 16 are returned to their original position so that again the rolls 1 are again locked, while rolls 2 are being driven by wheel 11.

By the use of the room temperature compensation strip 28 in operative association with the resistance causing the tariff change-over, due to the heating effect of said resistance during a change-over, the influence of the room temperature on the measuring instrument can approximately be eliminated so that a comparatively slight warming of the resistance (say, up to 50 centigrades) will suffice to accomplish the change-over. By the use of a resistance that permanently stands a heating of from 150-200 centigrade, the special room temperature compensation-member in the shape of the bimetallic strip 28 can in many cases also be done away with. When the strip 28 is not used the bimetallic strip 24 may be so dimensioned that it will act for both control and ambient temperature compensation.

The invention has various merits for multiple tariff counters. The resistance directly connected into the line or network requires so little space that the size of the counter is practically not increased. By the employment of such a resistance, deleterious effects on the operation of the measuring instrument as well as on the change-over means itself from outside influences are also avoided, buzzing or humming eliminated, and the necessity of using series resistances obviated.

Having thus described our invention, we claim:

1. In a multiple rate meter, two counting trains, a driving gear for each train, a differential gearing having a planetary gear and two sun gears, means coupling each driving gear to a sun gear to form two coupled units, means for driving said planetary gear in accordance with metered power, a rock shaft, a detent for each driving gear rigidly mounted on said rock shaft and being arranged so that only one detent can engage its driving gear at one time, a bell crank carried by said rock shaft, a second rock shaft having an arm rigidly coupled thereto, said last named arm engaging the other free end of the bell crank to form a toggle, a bimetal element coiled around said second rock shaft and coupled thereto so that said second rock shaft may be turned one way or the other depending on the condition of said bimetal element, switch controlled heating means for controlling the condition of said bimetal element thereby to select the detent for engaging its driving gear, and a second bimetal element coiled around the first rock shaft, secured thereto and exposed to normal temperature conditions to compensate for varying atmospheric temperatures.

2. In a multiple rate meter, two counting trains, a driving gear for each train, a differential gearing having a planetary gear and two sun gears, means for coupling each driving gear to a sun gear to form two coupled units, means for driving said planetary gear in accordance with metered power, a detent for each driving gear, said detents being mounted on a common rockable shaft and arranged to engage one driving gear or the other depending on the direction of rocking of said shaft, electrically heated bimetal means for rocking said shaft and another bimetal element responsive to atmospheric temperature and opposing the action of the heated bimetal element to compensate for atmospheric temperature variations.

3. In a multiple rate meter, two counting trains, a driving gear for each train, a differential gearing having a planetary gear and two sun gears, means for coupling each driving gear to a sun gear to form two coupled units, means for driving said planetary gear in accordance with metered power, a rock shaft, a detent for each driving gear rigidly mounted on said rock shaft and being arranged so that only one detent can engage its driving gear at one time, a bell-crank carried by said rock shaft and carrying means at one end thereof for indicating the effective rate being metered, a second rock shaft having an arm rigidly coupled thereto, said last-named arm engaging the other free end of the bell-crank to form a toggle, a bi-metal element coiled around said second rock shaft and coupled thereto so that said second rock shaft may be turned one way or the other depending upon the condition of said bi-metal element, switch controlled heating means for controlling the condition of said bi-metal element thereby to select the detent for engaging its driving gear and a second bi-metal element coiled around the first rock shaft and secured thereto with said second bi-metal element being exposed to normal temperature conditions to compensate against varying atmospheric temperatures.

RICHARD PUDELKO.
PAUL MOOS.

REFERENCES CITED

The following references are of record in the file of this patent:

UNITED STATES PATENTS

| Number | Name | Date |
| --- | --- | --- |
| 1,217,920 | Cummings | Mar. 6, 1917 |
| 1,937,451 | Willis, Jr. | Nov. 28, 1933 |
| 2,037,447 | Wenk | Apr. 14, 1936 |
| 2,081,044 | Runaldue | May 18, 1937 |
| 2,089,631 | Waite | Aug. 10, 1937 |
| 2,132,256 | Cameron | Oct. 4, 1938 |
| 2,144,589 | Rich | Jan. 17, 1939 |
| 2,211,773 | Hall | Aug. 20, 1940 |
| 2,213,339 | Downing, Jr. | Sept. 3, 1940 |
| 2,325,438 | Thomas et al. | July 27, 1943 |

FOREIGN PATENTS

| Number | Country | Date |
| --- | --- | --- |
| 156,491 | Switzerland | Nov. 16, 1932 |
| 242,750 | Great Britain | Nov. 19, 1925 |
| 436,957 | Great Britain | Oct. 17, 1935 |